Figure 1:
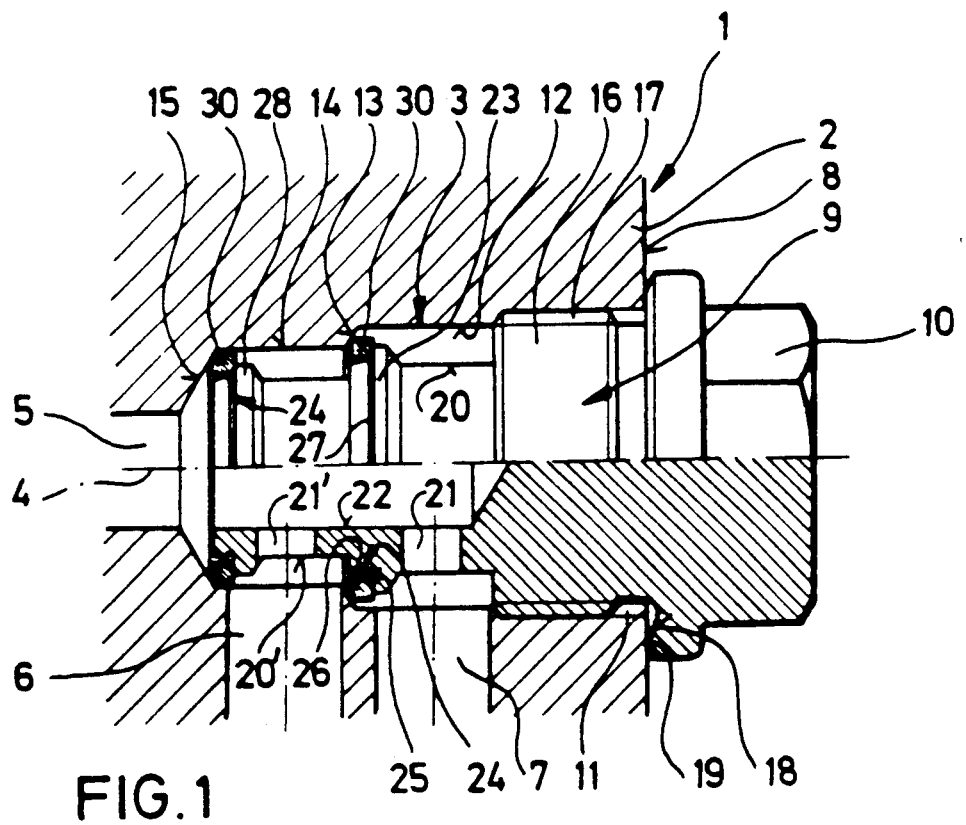

United States Patent [19]

Brunner

[11] Patent Number: 5,063,961
[45] Date of Patent: Nov. 12, 1991

[54] SCREW-TYPE VALVE HOUSING

[75] Inventor: Rudolf Brunner, Baldham, Fed. Rep. of Germany

[73] Assignee: Heilmeier & Weinlein Fabrik Fur Oel-Hydraulik GmbH & Co. KG, Munich, Fed. Rep. of Germany

[21] Appl. No.: 449,881
[22] PCT Filed: Jun. 8, 1988
[86] PCT No.: PCT/EP88/00513
§ 371 Date: Jul. 13, 1990
§ 102(e) Date: Jul. 13, 1990
[87] PCT Pub. No.: WO88/09890
PCT Pub. Date: Dec. 15, 1988

[30] Foreign Application Priority Data

Jun. 10, 1987 [DE] Fed. Rep. of Germany ....... 3719354

[51] Int. Cl.$^5$ ............................................. F16J 15/06
[52] U.S. Cl. ................................. 137/454.5; 137/489; 251/334; 251/363; 251/364
[58] Field of Search .................. 137/489, 454.5, 454.6; 251/334, 364, 363

[56] References Cited

U.S. PATENT DOCUMENTS

| | | | |
|---|---|---|---|
| 1,988,966 | 1/1935 | Eckhouse | 137/454.6 |
| 3,124,343 | 3/1964 | Williamson | 137/489 X |
| 3,285,631 | 11/1966 | Stolpmann | |
| 3,744,754 | 7/1973 | Demi | 137/454.5 X |
| 3,893,477 | 7/1975 | Stoll | |
| 3,903,919 | 9/1975 | Zeuner | 137/489 |
| 4,078,574 | 3/1978 | Kosarzecki | 137/454.5 X |
| 4,505,287 | 3/1985 | Blaedel | 251/334 X |
| 4,781,325 | 11/1988 | Finders | 137/454.5 |

FOREIGN PATENT DOCUMENTS

| | | |
|---|---|---|
| 921903 | 10/1953 | Fed. Rep. of Germany . |
| 2805040 | 8/1979 | Fed. Rep. of Germany . |
| 2069631 | 8/1981 | United Kingdom . |

Primary Examiner—Alan Cohan
Attorney, Agent, or Firm—Kinzer, Plyer, Dorn, McEachran & Jambor

[57] ABSTRACT

The stepped borehole and the valve housing are normally provided with cylindrical circumferential sections, which have been subjected to fine finishing and which are in exact axial alignment with the borehole axis, O-rings being provided as sealing elements between these cylindrical circumferential sections. The production is expensive and requires a lot of work. The new connection is to be simpler from the point of view of production technology, easy to repair and easy to assemble. In order to achieve this, each sealing element (30, 30'), which is positioned within the tapped borehole (3, 3', 3", 3''') is a soft metal ring which has been cold-formed between the diametral step (15, 13) and a support surface of the housing under the influence of the thread tightening tension and which, due to its elasticity, compensates tolerances or inaccuracies resulting from the manufacturing process, ensures perfect sealing and contributes to a simplification of the manufacturing process and of the assembly operation. Such connections are suitable for hydraulic control devices in the case of which preferably exchangeable pilot, control, non-return, safety and other valves have to be screwed into a block for fulfilling the control function.

14 Claims, 3 Drawing Sheets

SCREW-TYPE VALVE HOUSING

From the prospectus No. 5.202.0/3.87 of the firm of Flutec, D-6603 Sulzbach/Saar, "Directional Seat Valves WSE 2", it is known to screw a cartridge-type valve housing containing a two-way seat valve into the stepped borehole of the supporting body designed as a block or housing, in which various channels of the hydraulic system and pipe connections are arranged. The stepped borehole has three cylindrical sections mutually offset axially by conical shoulders and is prolonged by a pump channel extending in the direction of the borehole axis. The valve housing has matching cylindrical sections, two of which have annular grooves in which an O-ring is fitted. The sections and the conical diametral steps of the stepped borehole require precision finishing of their surfaces, and, in addition, special attention must be paid to the fact that the sections and the diametral steps are coaxial with the borehole axis. The precision finishing is necessary not only with regard to the sealing effect of the O-rings but also for avoiding any damage which may be caused to said O-rings when the valve housing is inserted and screwed in position. In addition to this high manufacturing expenditure and the comparatively complicated assembly, the valve housing requires a comparatively large installation length so that it cannot be installed in thin-walled piston bases, cylinder bases or housing walls. A special disadvantage of this connection principle is that inaccuracies caused by the manufacturing process, which will cause leakage of the connection, will result in a very high reject rate of the housings or blocks defining the supporting body, said housings or blocks being precisely the most expensive components of the hydraulic system. A secondary treatment of a reject housing or block is hardly possible, since the sealing effect can then no longer be achieved. Repairs of a housing or of a block within which leakage occurs in the stepped borehole are hardly possible either.

In the pilot controlled check valve known from German-pat. 28 05 040, which is screwed into a tapped borehole, an O-ring surrounded on at least half of its periphery by a shoulder of the valve housing is placed against the conical diametral step of the stepped borehole. The circumferentially extending supporting rib, which grips the O-ring, is pressed against the diametral step so that the O-ring cannot flow under the hydraulic pressure subsequently exerted on it. Exterior sealing of the stepped borehole is guaranteed by the interlocking screw threads of the stepped borehole and of the valve housing, another external seal which is clamped down by a screw-in head at the outer end of the valve housing being used, if necessary. Also this principle requires complicated precision finishing of the inner wall of the stepped borehole and of the diametral step so as to avoid damage which may be caused to the O-ring during insertion. If leakage occurs at the diametral step which cannot be remedied by changing the O-ring, the diametral step can only be subjected to a secondary treatment in cases in which the valve housing has not been screwed in with a screw-in head limiting its depth of insertion, since otherwise the O-ring cannot be sealingly repositioned. High reject rates due to manufacturing inaccuracies also occur in this case.

The present invention is based on the task of providing a connection of the type mentioned at the beginning, which is less expensive to manufacture, easy to assemble and easy to repair and which is characterized by a small insertion length for the valve housing. The manufacturing costs are to be cut by a reduction of the reject rate of the housings or blocks as a result of less stringent requirements in regard to precision.

In accordance with the present invention, the posed task is solved by the features disclosed in the characterizing clause of patent claim 1.

Due to their deformability, the soft metal rings, which are cold-formed between the respective support surface and the diametral step by means of the thread tightening tension and which reliably provide perfect sealing in the case of the highest pressures, counterbalance, surprisingly enough, manufacturing tolerances and possible manufacturing inaccuracies, e.g. deviations which occur in the distance between the outer side of the supporting body and the diametral step or in the distances between the sections of the valve housing and which exceed the range of tolerance, even if they are cold-formed in common between surfaces which are rotated relative to one another upon screwing in the housing. On the other hand, said soft metal rings, when being cold-formed, impede the rotational movement of the housing much less than might be expected. Each ring deforms to the extent required for compensating dimensional inaccuracies and for obtaining the necessary sealing effect of the other ring, i.e. the locally separate rings cooperate with one another until perfect sealing is obtained in all sealing zones. Furthermore, it is not necessary to pay special attention to the surface quality of the wall sections of the stepped borehole, since the soft metal rings develop their sealing effect between the diametral step and the support surface on the valve housing. For these reasons, the supporting body as well as the valve housing can be used in accordance with their intended use even if they would already have been rejects in conventional connections. The assembly is simple, since the resistance to deformation of the soft metal rings is known and since it is only necessary to observe a specific tightening moment for the valve housing in the case of which sealing is guaranteed. Repairs can be carried out in the stepped borehole as well as at the valve housing itself, since a secondary treatment of the diametral step and/or of the support surface on the valve housing can be performed by means of simple tools and since, due to its large axial compensation range, a new soft metal ring will again be able to adapt itself to the new circumstances. Each soft metal ring in the interior of the stepped borehole can be deformed throughout a comparatively large axial area without any deterioration of its sealing effect, whereby deviations in the distance from the diametral step to the free outer side of the supporting body or in the length of the valve housing are compensated for. The valve housing has thus a desirably short installation length.

It is true that soft metal rings used as sealing elements are known from other fields of technology, "Taschenbuch für Maschinenbau" ("The Mechanical Engineering Handbook") (Dubbels, 1955, 1$^{st}$ volume, page 724), but these known cases use one ring alone and they do not use a ring which cooperates with another soft metal ring. Furthermore, the soft metal ring is positioned between surfaces which are pressed together along a straight line and which must not be rotated relative to one another when they are tightened against one another. Used as an individual seal, a soft metal ring cannot develop to a substantial degree its ability to compensate tolerances while maintaining the sealing effect.

It will be expedient to use specific materials for the rings, said materials being, however, only an expedient choice from a large number of possible materials. The only important point is that the soft metal ring has a consistency and a strength having—in comparison with the strengths of the supporting body and of the valve housing—just such a value that the thread connection between the supporting body and the valve housing is not excessively stressed when the soft metal ring is being cold formed in the intended manner.

An alternative embodiment includes a soft core in a jacket. It is thus possible to adjust a purposeful softness and cold-deformability of the soft metal rings, said rings being deformable only to such an extent that they do not automatically flow under the influence of the hydraulic pressures to be taken up and that they do not produce any major impressions in the clamping surfaces.

Furthermore, it will be expedient to use a square ring cross-section, since such soft metal rings are commercially available in many sizes and are, moreover, economy-priced. The ring cross-section is rather of secondary importance, since it will be changed by the cold-deformation process anyhow. Circular or oval ring cross-sections may be used just as well.

In addition, it will be expedient to use specific materials for the supporting body, which guarantee a sufficient tightening tension of the interlocking threads on the one hand and a sufficient resistance of the support surfaces to the soft metal rings on the other.

Furthermore, it will be expedient to clamp the rings in a specific manner, since such special clamping structurally corresponds to the cold formability of the soft metal rings, which is a specific property of the material used for said rings, insofar as, when pressed against the conical surface, each soft metal ring can be deformed easily and throughout a comparatively large area in the direction of the borehole axis, a large sealing surface being thus produced already after a comparatively small axial deformation length. Due to its square ring cross-section, the soft metal ring first abuts on the conical surface along an edge prior to being cold-formed under the influence of the tightening tension and against a resistance which is comparatively small at the beginning until the edge is deformed such that it defines a bead with good sealing properties. In the course of this process, the soft metal ring can even slide along the conical surface so as to enlarge the axial area within which it axially compensates the deviations in tolerances or the manufacturing inaccuracies which have been mentioned at the beginning.

In the case of an additional embodiment, two soft metal rings abut on one and the same diametral step, said two soft metal rings providing in common a particularly efficient sealing between neighbouring areas in the stepped borehole even in the case of high pressure differences. By means of this structural design, a more reliable safety function is achieved, since even if leakage occurs at one soft metal ring, the other ring will still guarantee the necessary tightness.

One important embodiment will be serviceable in cases of use in which an auxiliary control channel or a connection for an additional function of the valve accommodated within the valve housing is required in addition to the working connections leading to the stepped borehole. Known screw-type valve housings do not provide any space for this purpose. In accordance with the invention, however, an additional connection leading to the stepped borehole is accommodated in a simple manner and such that it takes up very little space, said additional connection being separated from the other connections and an additional function for the valve included in the valve housing being thus achieved. In view of the fact that the two rings abutting on the same diametral step define between them a sealed annular chamber, the mouth of at least one pilot channel leading to the stepped borehole can open into said annular chamber, whereas the valve housing has provided therein a passage which is in alignment with this zone. This is an important aspect e.g. for pilot controlled check valves or for pilot-operated and additionally relievable safety valves, in particular if an increase in the installation length or a change in the structural design of the valve housing is required for the additional function. If, however, a valve housing whose valve does not require this additional function is screwed into the stepped borehole, this will not make any difference in view of the fact that the annular chamber is closed. The principle of sealingly supporting two rings on the same diametral step and of positioning the mouth of a pilot channel therebetween can also be used in the case of screw-type valve housings which are not sealed by means of soft metal rings, but in a conventional manner. In spite of the fact that the two soft metal rings are arranged one after the other at a small distance from one another, they can axially be deformed to such an extent that each individual ring will produce the desired sealing effect.

In the case of an additional embodiment, which includes an exterior sealing element positioned below a screw-in head, also the problem of achieving external sealing of the stepped borehole is solved in a simple manner. The soft metal rings arranged in the interior of the stepped borehole provide the prerequisites for a comparatively large axial range of movement of the screwed-in housing within which the exterior soft metal ring can be clamped down so as to produce the sealing effect which is expected of said soft metal ring. Even after an exchange of the valve housing, e.g. when repair work is carried out, it will only be necessary to replace the soft metal rings by new ones so as to reachieve the demanded sealing effect even in cases in which the diametral step and/or the outer support surface have been subjected to a secondary treatment which changed their dimensions by some tenths of a millimetre.

Although in the case of clamping surfaces which extend at right angles to the borehole axis, the soft metal ring used as an exterior sealing element will not be axially deformable to the extent to which the soft metal ring arranged in the interior of the stepped borehole and resting on the conical support surface can be deformed, said deformation will suffice to prevent leakage. However, while maintaining the sealing effect, the interior soft metal ring can be axially deformed to such an extent that the soft metal ring positioned below the screw-in head can be clamped in a sufficiently firm manner for providing a perfect sealing effect.

In the case of an additional embodiment, the soft metal ring arranged in the interior of the stepped borehole is granted less axial deformability between the support surfaces extending at right angles to the borehole axis, but the exterior soft metal ring is adapted to be deformed on the conical support surface throughout a larger axial area. The support surfaces provided in the interior of the stepped borehole and extending at right angles to the borehole axis offer in some cases advantages with regard to production technology.

When each soft metal ring is secured in position on the housing, it will be less difficult to mount the valve housing in the stepped borehole. This shape of the circumferential surface and the circumferentially extending groove also provide additional space for the deformation of each soft metal ring under the influence of the tightening tension, and, moreover, it is also guaranteed that each cold-formed soft metal ring has a large area of contact with the valve housing.

A cutting edge on the screw-in head guarantees reliable sealing in a simple manner even in cases in which the valve housing is screwed in and out several times. In view of the fact that the soft metal rings located in the interior of the stepped borehole are able to undergo comparatively large axial deformations without any deterioration of the sealing effect, the cutting edge can always be pressed into the support surface on the supporting body to such an extent that the desired sealing effect is produced. Attention should only be paid to the fact that the axial dimensions of the soft metal rings are of such a nature that cold deformation of these rings between the clamping surfaces will already take place before the cutting edge has fully penetrated into the support surface. In other words, the cold deformation of the soft metal rings accommodated in the stepped borehole begins prior to the cutting operation of the cutting edge and prior to the clamping down of the exterior sealing element.

Finally, an additional embodiment provides, in combination with a very small insertion depth of the valve housing, the additional function of hydraulically relieving the safety seat valve.

Figure 2:
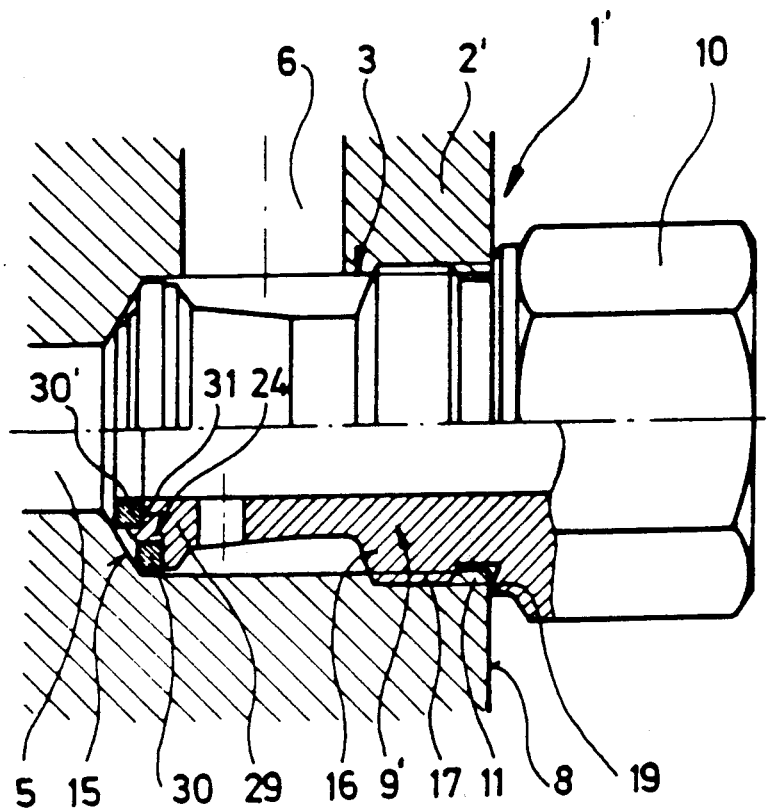
Figure 3:
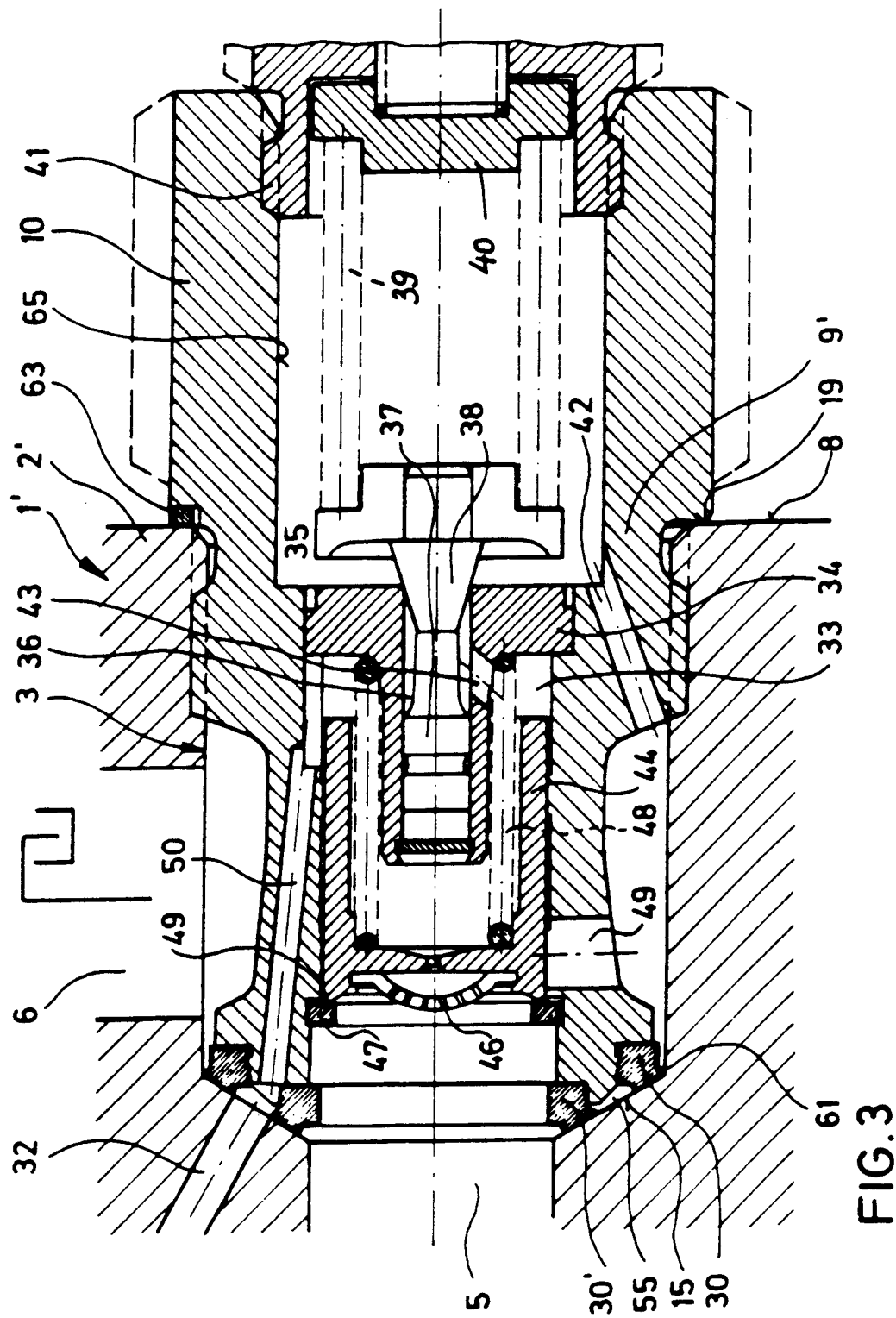
Figure 4:
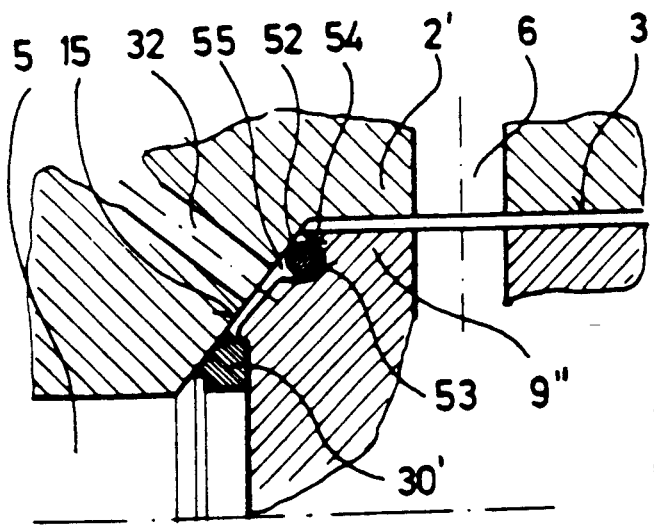
Figure 5:
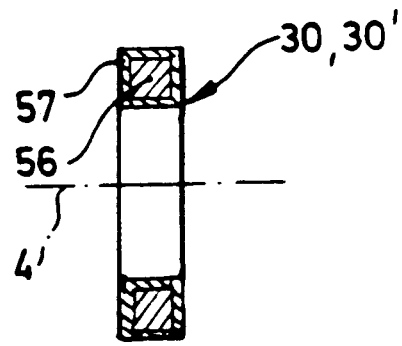
Figure 6:
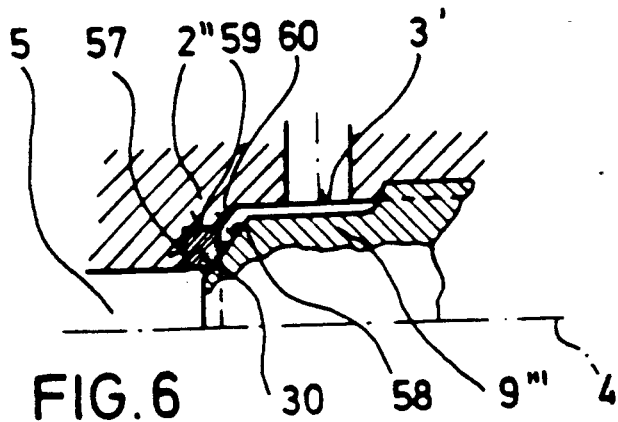
Figure 7:
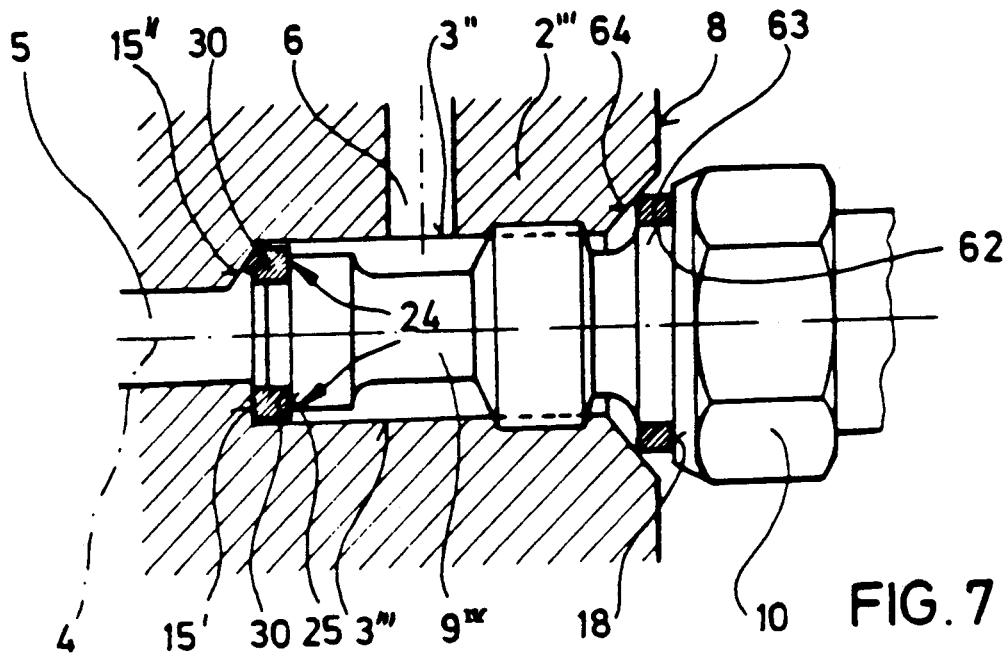

Embodiments of the subject matter of the invention are explained on the basis of the drawing, in which FIG. 1 shows a first embodiment of a valve housing screwed into a stepped borehole, the upper half showing an axial section of the stepped borehole and the lower half showing an axial section of the valve housing, FIG. 2 shows a similar sectional view of an additional embodiment, FIG. 3 shows the embodiment of FIG. 2 in detail, FIG. 4 shows a partial section of an additional embodiment, FIG. 5 shows an axial section of a detail variation, FIG. 6 shows a partial section of an additional embodiment, and FIG. 7 shows an axial section of an additional embodiment, the details of the upper half deviating from those of the lower half.

FIG. 1 shows a part of a metallic supporting body 2, which belongs to a hydraulic control device 1 of a high-pressure hydraulic system and which is provided with a stepped borehole 3, a valve housing 9 being screwed into said stepped borehole. The supporting body 2 can, for example, be a housing or a block having channels and conduit connections as well as fastening means for the control device 1 (not shown). The supporting body 2 could, however, also be the base of a piston, the base of a cylinder, or a housing wall into which the valve housing 9 is screwed in. The valve housing 9 includes components (not shown) of a valve constructed for the respective case, e.g. of a check valve, a pilot valve, a relay valve, a safety valve, a magnetic valve, a proportional valve or the like.

In the direction of the borehole axis, which is provided with reference numeral 4, the stepped borehole 3 is extended by a channel 5 having a smaller diameter. Adjacent said channel 5 an additional channel 6 and adjacent said channel 6 an additional channel 7 lead into the stepped borehole 3. The supporting body 2 has a flat support surface 8 round the free end of the stepped borehole 3.

The valve housing 9 is provided with a screw-in head 10, which, however, need not necessarily be integrally connected with the valve housing 9. A female thread 11 is cut into a cylindrical section 12 close to the external end of the stepped borehole 3. The channel 7 leads into the section 12. A cylindrical section 14 of smaller diameter follows said section 12 via a diametral step 13 formed as a conical surface. And said cylindrical section 14 merges with the channel 5 via a diametral step 15 which is conical as well.

The valve housing 9 includes a section 16 provided with a male thread 17, which is screwed into the female thread 11 with a specific tightening tension. The lower side of the screw-in head 10 is provided with a support surface 18 having a circumferentially extending cutting edge 19 in the case of this embodiment. Subsequent to the section 16 of the valve housing 9 a cylindrical area 20 of narrower width is provided, said area 20 having circumferentially distributed openings 21 leading to a space 22 in the interior of the housing 9. The area 20 is followed by a flangelike thickened portion 23 having a shoulder 24, which faces the channel 5 and which has an angular cross-section. The shoulder 24 is delimited by a support surface 25, which extends at right angles to the borehole axis 4, and by a conical circumferential surface 26, which slightly tapers towards the channel 5 in the direction of the borehole axis 4. A circumferentially extending narrow groove 27 is provided between the support surface 25 and the circumferential surface 26.

On top of an additional area 20', which includes circumferentially distributed openings 21', a further flange-like thickened portion 28 is provided, said thickened portion 28 being provided with an additional shoulder 24 having the above-mentioned structural design.

A sealing element 30 consisting of a soft metal ring is secured in position in each of the shoulders 24 of the thickened portions 23 and 28. The ring cross-section of the soft metal ring is approximately square with outer and inner peripheral surfaces which are approximately coaxial with the borehole axis 4. The dimensions of the ring cross-section are chosen e.g. in such a way that the exterior edge of the cross-section clearly projects beyond the outer periphery of the thickened portion 23 and 28, respectively. Furthermore, the cross-section of each sealing element 30 is dimensioned such that, when the valve housing 9 is being screwed in, the two soft metal rings will already abut on the diametral steps 15 and 13, respectively, before the cutting edge 19 penetrates into the support surface 8. It is thus achieved that, when the cutting edge 19 penetrates into the support surface 8, the soft metal rings are cold-formed at the diametral steps 15 and 13 to such an extent that the channel 5 is sealed against the channel 6, said channel 6 is sealed against the channel 7, and said channel 7 is sealed against the surrounding area via the cutting edge 19. Inaccuracies caused by the manufacturing process or tolerances in the axial distances between the support surface 8 and the diametral steps 13 and 15 as well as between the support surface 18 and the support surfaces 25 of the shoulders 24 of the thickened portions 23 and 28 are compensated due to the fact that the sealing elements 30, i.e. the soft metal rings provided at these locations, are deformed to a greater or lesser extent. Thanks to the fact that the soft metal rings abut on the conical diametral steps 15 and 13, whose angle of cone is approximately 120°, said soft metal rings can be deformed within comparatively large axial areas without any influence on the sealing effect.

When the valve housing 9 and the screw-in head 10 are separate components, only the valve housing 9 will first be screwed in until the two sealing elements 30 have been deformed in an adequate manner. The screw-in head 10 is then screwed in until the necessary sealing effect of the cutting edge 19 has been achieved. The soft metal rings in the interior of the stepped borehole 3 counterbalance also alignment errors of the sections 12 and 14 and of the diametral steps 13 and 15 relative to the borehole axis 4 so that such inaccuracies caused by the manufacturing process are compensated for as well.

If it is necessary to eliminate a leakage which has occurred during operation of the control device 1 between the channels 5 and 6 or between the channels 6 and 7 or between the channel 7 and the outer side of the supporting body 2, the valve housing 9 will be screwed out and the diametral step 15 or 13 or the support surface 8 will be subjected to a secondary treatment, which can be carried out by means of simple tools, prior to screwing the valve housing 9 again into the control device 1 making use of new soft metal rings. If it should be foreseeable that, due to the secondary treatment, the non-deformed cross-section of the soft metal rings will not suffice to provide sufficient deformation under the tightening tension, soft metal rings having an adequate greater axial height will be used so that the desired sealing effect can again be achieved. In the case of such repair work neither the supporting body 2 nor the housing 9 have to be replaced or thrown away.

In the case of the embodiment according to FIG. 2, a different valve housing 9' is screwed into the stepped borehole 3 of a supporting body 2' of another hydaulic control device 1'. The supporting body 2' has only provided therein the channels 5 and 6. Prior to section 16, the valve housing 9' has provided thereon a flange-like thickened portion 29 including on the outer side thereof the shoulder 24, which is used for a sealing element 30 in the form of a soft metal ring and which has been explained in connection with FIG. 1, as well as a shoulder 31, which is located further inwards in the radial direction and which is used for a sealing element 30' consisting of a soft metal ring whose cross-section is approximately equal to that of the sealing element 30. Both sealing elements 30 and 30' abut on the same diametral step 15 in positions in which they are radially as well as axially displaced relative to each other. By means of the tightening tension, which is applied e.g. by the screw-in head 10, said sealing elements are cold-formed to such an extent that they seal the channel 5 against the channel 6. With the aid of this double arrangement of the sealing elements 30, 30', an improved safety function is achieved with regard to the sealing effect. Being soft metal rings, the two sealing elements 30, 30' abutting on the conical diametral step 15, which has an angle of cone of approx. 120°, are capable of counterbalancing possibly existing axial inaccuracies which are caused by the manufacturing process or tolerances while providing still jointly as well as individually the necessary sealing effect.

FIG. 3 shows the sealing principle of the connection according to FIG. 2 used in the case of a pilot-operated safety seat valve which can additionally be hydralically relieved. With regard to the additional function of relievability, the supporting body 2' has provided therein a pilot channel 32 which ends in the area of the diametral step 15 between the two sealing elements 30, 30'. In the present case, this channel 32 is normally blocked. Only if the safety valve is to be relieved abruptly, the pilot channel 32 will be vented.

The valve housing 9', which is screwed in by means of the screw-in head 10—while the cutting edge 19 cuts into the support surface 8—until both sealing elements 30, 30' have been cold-formed at the diametral step 15 (beads 61 resulting from the cold-forming process are outlined) and provide their sealing function, has formed therein a longitudinally extending cylindrical chamber 33 into which an insert member 34 is screwed in, which has a T-shaped cross-section and which is provided with an outlet valve seat 35 leading out of a chamber 36, which is connected to the chamber 33 via connecting passages 43. A damping piston 37 is adapted to be displaced within the chamber 36, said damping piston 37 carrying at one end thereof a spring abutment and a conical closure element 38 cooperating with the outlet valve seat 35 in the form of a pilot valve. A spring 39 presses the closure element 38 onto the outlet valve seat 35 and rests on an additional abutment 40, which is adapted to be axially displaced by means of a threaded spindle 51 within a nut 41 screwed into the screw-in head 10. The screw-in head 10 contains a chamber 65 which is in flow connection with the section of the stepped borehole 3 communicating with a reservoir via the channel 6, said flow connection being established via a channel 42. The channel 5 has applied thereto the pressure for which the safety valve is provided.

Within the chamber 33 of the valve housing 9', a piston 44 is adapted to be sealingly displaced against a spring 48 resting on the insert member 34. The piston 44 includes a throttle orifice 45, which is outwardly covered by a screen 46. Furthermore, the piston 44 carries a circumferentially extending closure element 49 cooperating with a seat ring 47, which is secured in position within the valve housing 9', so as to form a safety valve. The sealing elements 30, 30' delimit an annular chamber 55, which is sealed against the channels 5 and 6 and from which a channel 50 leads to the chamber 33 of the valve housing 9'.

In the upper half of FIG. 3, it is outlined that, instead of the cutting edge 19 of the screw-in head 10, it is also possible to provide an exterior sealing element 63 consisting of a soft metal ring, which is clamped in position between support surfaces extending at right angles to the borehole axis, subject to the proviso that, when the sealing effect at the sealing element 63 is achieved, the sealing elements 30, 30' have already been deformed to such an extent that they seal the annular chamber 55 against the channels 5 and 6.

The safety valve operates as follows:

The safety valve 49, 47 is closed up to a specific pressure limit within the channel 5. The existing pressure passes through the throttle orifice 45 into the chamber 33 and acts on the piston 44 together with the spring 48 in the closing direction. Via the connecting passages 43, said pressure simultaneously acts on the closure element 38, which is kept closed by the spring 39 within the chamber 65, which is vented to the reservoir, in accordance with the preload of the spring 39 which can be adjusted by means of the spindle 51.

If the pressure within the channel 5 exceeds the pressure limit, which has been adjusted e.g. with the aid of the spindle 51, the closure element 38 will lift off the outlet valve seat 35, and this will have the effect that such an amount of pressure medium flows into the chamber 65 and from said chamber through the channel 42 into the reservoir that the adjusted pressure limit is observed. In the case of a higher increase in pressure, the piston 44 plus the closure element 49 will be lifted off the seat ring 47; pressure medium will then be discharged directly into the reservoir. The pressure within the channels 50 and 32 and within the annular chamber 55 corresponds to that within the chamber 33 because the pilot channel 32 is blocked. If an abrupt relief is required, the pilot channel 32 will be opened, the pressure within the chamber 33 will collapse, and the safety valve 49, 47 will open widely and independently of the pilot valve 35, 38. The pressure within the channel 5 will decrease to a level which is determined by the force of the springs 48 and 39. As soon as the pilot channel 32 is blocked again, the safety valve will fulfil again its normal function.

FIG. 4 shows more clearly a detail variation of FIG. 3 in the case of which the annular chamber 55 is sealed against the channels 5 and 6 on the inner side by the sealing element 30' consisting of a soft metal ring and on the outer side by a conventional resilient sealing ring 52, e.g. an O-ring. For this purpose, the valve body 9" has formed therein a circumferentially extending U-shaped supporting groove 53 for the sealing ring 52, the outer boundary of said supporting groove 53 being formed by a projecting supporting edge 54, which, under the influence of the tightening tension of the valve body 9", is moved until it abuts on the diametral step 15 and which may even penetrate into said diametral step. This axial movement of the supporting edge 54 is permitted by the sealing element 30', i.e. the soft metal ring, which is deformed at the diametral step 15. The supporting edge 54 prevents the O-ring 52 from flowing under the hydraulic pressure.

In the case of the detail variation of the sealing elements 30, 30' according to FIG. 5, which can be used in connection with the above explained embodiments, the structural design provided is not a continuously massive structural design, but an elastic or a tenacious-elastic core 56 enclosed on all sides thereof by a soft metal jacket 57. In the case of this structural design a good deformability of the sealing element 30, 30' is achieved and it is still guaranteed that the deformed sealing element does not flow under the hydraulic pressure. As has already been mentioned, the cross-sectional shape of the sealing element 30, 30' is only of secondary importance. Hence, it would definitely be possible to choose a cross-sectional shape which deviates from a square shape for the soft metal jacket 57 and the core 56.

In the case of the embodiments of FIGS. 1 to 4, the sealing element 30, 30' abuts on a conical diametral step 13, 15 within the stepped borehole 3, 3', and it is acted upon by the tightening tension through the housing 9, 9', 9" via a support surface, e.g. 25, extending at right angles to the borehole axis 4. The conical surface of the diametral step has the advantage that the soft metal ring can be deformed throughout a comparatively large area in the axial direction. In FIG. 6, however, it is clearly shown that the sealing element 30, a soft metal ring, can be secured in position at the diametral step of the stepped borehole 3' between a support surface 57, which extends at right angles to the borehole axis 4, and a circumferential surface 59 corresponding to the circumferential surface 26 (FIG. 1), whereas the valve housing 9''' is provided with a conical support surface 58 which abuts on the sealing element 30. In this case, too, the area in which axial cold-forming can take place is obtained, the tightening tension of the screwed-in in valve housing 9''' remaining relatively constant.

It will be expedient when, for the purpose of inserting the sealing element 30, a conical shoulder 60 is provided subsequent to the circumferential surface 59. Furthermore, it would be imaginable to deform the soft metal ring between two approximately parallel conical surfaces so as to obtain a very large area within which axial deformation can take place while the sealing effect remains the same.

In the case of the embodiment according to FIG. 7, the valve housing $9^{IV}$ with a sealing element 30, which is formed by a soft metal ring, is screwed into the stepped borehole 3'' (upper half) and 3''' (lower half), respectively. On its inner end, the valve housing $9^{IV}$ is equipped with the shoulder 24, which has already been explained and which is provided with the support surface 25 extending at right angles to the borehole axis 4. The diametral step 15'' is formed as a conical surface within the stepped borehole 3''. The lower half of FIG. 7, however, shows that the stepped borehole 3''' can also have provided therein a diametral step 15' which extends at right angles to the borehole axis 4, and this may possibly be advantageous from the point of view of the manufacturing process. In the case of this last-mentioned embodiment, the sealing element 30 is clamped down within the stepped borehole between two support surfaces 25 and 15' extending at right angles to the borehole axis 4. The free end of the stepped borehole 3'' or 3''' is provided with a conical bevel 64 which is in sealing contact with an exterior sealing element 63 consisting of a soft metal ring, said exterior sealing element 63 being deformed under the influence of the tightening tension. For this purpose, the support surface 18 of the screw-in head 10 is provided with a flat shape. Furthermore, the screw-in head 10 is followed by a threadfree shaft section 62 having attached thereto the exterior sealing element 63.

In the case of this embodiment, the exterior sealing element 63 already abuts on the conical surface of the bevel 64 before the sealing element 30 has been clamped down finally. Due to the conical surface 64, the exterior sealing element 63 can compensate a comparatively large axial length along which the valve housing $9^{IV}$ is screwed in until the sealing element 30 has been clamped down between the support surfaces 15', 25 to the extent required. In this way, axial inaccuracies which are due to the manufacturing process and in view of which the distance between the free outer surface 8 of the supporting body 2''' and the diametral step 15 and 15', respectively, does not correspond to the nominal size are compensated for primarily through the exterior sealing element 63. If both sealing elements 30, 63 abut on conical surfaces (upper half of FIG. 7), a sealing effect will be achieved in both areas in response to a comparatively low tightening tension. The surfaces 15, 15', 64 can easily be subjected to a secondary treatment for the purpose of eliminating leakage.

I claim:

1. A connection between a screw-type valve housing (9, 9', 9'', 9''', $9^{IV}$) and a metallic supporting body (2, 2', 2", 2'") of a high-pressure hydraulic system, said supporting body being provided with a stepped borehole (3, 3', 3") which is used for the valve housing and which communicates with the mouths of at least two connections (5, 6, 7) separated from each other by a diametral step (15, 13) in the longitudinal direction of the borehole, said stepped borehole having provided therein at least two sealing elements (30, 30', 52) clamped in position between the valve housing and the wall of the borehole and used for mutually sealing off the individual connections, characterized in that the sealing elements (30, 30') which are positioned within the stepped borehole (3, 3', 3", 3'") are soft metal rings which have been cold-formed between the diametral step (15, 13) and a support surface (25) of the valve housing (9, 9', 9", 9'", 9$^{IV}$) as a result of rotational contact and compression due to the threading of the valve housing into the stepped borehole.

2. A connection, according to claim 1 in that the soft metal rings consist of copper, aluminum, soft iron, lead or a similar soft metal.

3. A connection according to claim 1, characterized in that the soft metal rings have an elastic or a tenacious-elastic core (56) and a soft metal jacket (57) which fully encloses said core.

4. A connection according to claim 1, characterized in that the soft metal rings are circular ring disks having preferably a square ring cross-section.

5. A connection according to claim 4, characterized in that the material of the supporting body (2, 2', 2", 2'") is aluminum, a light metal alloy, cast iron or steel.

6. A connection according to claim 5, characterized in that each soft metal ring is clamped in position between a conical surface (15, 13, 64) (angle of cone approximately 120°), which widens in the direction of the borehole axis (4) and towards the free end of the borehole, and the support surface (25, 15') extending at right angles to the borehole axis (4).

7. A connection according to claim 1, characterized in that two radially as well as axially displaced, coaxial soft metal rings (30, 30') have been cold-formed at the same diametral step (15).

8. A connection according to claim 7, characterized in that at least one pilot channel (32) opens into the stepped borehole (3) between the soft metal rings (30', 30).

9. A connection according to claim 1 comprising an exterior sealing element, which is used for sealing the stepped borehole towards the outside and which is clamped in position in response to the thread tightening tension, characterized in that also the exterior sealing element (63) is a soft metal ring clamped down by a screw-in head (10) of the valve housing (9', 9$^{IV}$).

10. A connection according to claim 9, characterized in that the exterior sealing element soft metal ring (63) is clamped in position between a support surface (18), which is part of the screw-in head (10) and which extends approximately at right angles to the borehole axis (4), and a support surface (8), which is located at the free end of the stepped borehole (3) and which extends at right angles to the borehole axis (4).

11. A connection according to claim 1, characterized in that the exterior sealing element soft metal ring (63) is clamped in position below the screw-in head (10) between a conical support surface (64) and a support surface (18) extending at right angles to the borehole axis (4), and that each soft metal ring is compressed in the stepped borehole (3"), preferably between two support surfaces (15', 25) extending at right angles to the longitudinal axis (4) of the borehole.

12. A connection according to claim 6, characterized in that the exterior sealing element soft metal ring is held on the valve housing (9, 9') on a shoulder (24), which is delimited by the support surface (25) extending at right angles to the borehole axis (4) and by a circumferential surface (26) tapering slightly conically in the thread tightening direction, and that a narrow circumferentially extending groove (27) is provided between the support surface (25) and the circumferential surface (26).

13. A connection according to claim 8, characterized in that the valve housing (9') has accommodated therein a pilot-operated and also hydraulically relievable safety seat valve (47, 49), which monitors the pressure within a channel (5) forming an extension of the stepped borehole (3) and which, in response to excessive pressure, opens towards a lateral connection channel (6) separated from the channel (5) by means of the soft metal rings (30, 30'), and that a relief channel (50) within the valve housing (9') opens into an annular chamber (55), which is defined between the soft metal rings (30, 30') and which is connected to the pilot channel (32) ending within the supporting body (2') in the diametral step (15) and permitting pressure to pass therethrough so as to relieve the safety seat valve (47, 49).

14. A connection according to claim 1, comprising an exterior sealing element (19) which is used for sealing the stepped borehole towards the outside and which is clamped in position in response to the thread-tightening tension brought about by the threading of the valve housing into the stepped borehole, characterized in that the exterior sealing element (19) is defined by a circumferentially-extending cutting edge on the support surface (18) of the screw-in head (10) of the housing (9, 9'), said cutting edge cutting into the support surface (8) round the free end of the stepped borehole (3) under the influence of the tightening tension of the valve housing (9, 9').

* * * * *